United States Patent [19]

Swonger

[11] 4,432,150
[45] Feb. 21, 1984

[54] STRETCHER FRAME FOR AN ARTIST'S CANVAS

[76] Inventor: Russell A. Swonger, Rte. 3, Box 3112, Spooner, Wis. 54801

[21] Appl. No.: 386,713

[22] Filed: Jun. 9, 1982

[51] Int. Cl.³ .............................................. D06C 3/08
[52] U.S. Cl. ................................ 38/102.5; 160/374.1; 312/140; 403/402
[58] Field of Search ............... 38/102.5, 102.41, 102.1, 38/102.3; 160/374.1, 378, 381; 312/140; 403/295, 402

[56] References Cited

U.S. PATENT DOCUMENTS

| 112,435 | 3/1871 | Fairman | 160/374.1 |
| 3,651,854 | 3/1972 | Terna | 160/374.1 |
| 3,882,616 | 5/1975 | Starzyk | 38/102.1 |
| 3,924,343 | 12/1975 | Johnson | 38/102.1 |

FOREIGN PATENT DOCUMENTS

| 16706 | of 1887 | United Kingdom | 160/374.1 |
| 1203305 | 8/1970 | United Kingdom | 403/295 |

Primary Examiner—Werner H. Schroeder
Assistant Examiner—Andrew M. Falik

[57] ABSTRACT

A stretcher frame for an artist's painting canvas which include a plurality of individual frame members specifically designed to permit the outer peripheral dimensions thereof to be expanded to enlarge the dimensions of the frame and stretch the canvas. The structure includes a sliding bridge connection between the adjacent frame members in a manner to cause tilting of the inner peripheral edges rearwardly away from the canvas secured to said outer edges and thus, prevent brush contact with the underlying frame surface during the painting operation. A spreading force is applied as by wedges, to the ends of said adjacent members to spread the adjacent mating surfaces apart to expand the outer frame dimensions.

8 Claims, 11 Drawing Figures

STRETCHER FRAME FOR AN ARTIST'S CANVAS

BACKGROUND OF THE INVENTION

In the past, canvas stretching frames have had the problem of having the underlying surface of the frame member disposed either adjacent to or very close to the overlying layer of canvas being supported thereon. This produces the problem of having an outer peripheral edge of the canvas which has underlying backing support from the underlying surface of the frame members, so that when the artist is brushing across the transitional line between the supported area to the unsupported area, a line of demarcation will be produced by the brush strokes extending across this transition line. This difference in backing support has been a troublesome problem for artists for many years.

The present invention provides a stretcher frame which tilts the inner edges of each frame member rearwardly away from the canvas during the stretching operation. This rearward spacing is a sufficient distance so that brush strokes extending across the inner frame edge will not actually displace the canvas rearwardly into contact with the underlying front surface of the frame since there will, in effect, be no underlying frame surface engaged with the marginal edge of the canvas, as best shown in FIGS. 5 and 6.

SUMMARY OF THE INVENTION

The invention relates to a canvas stretcher frame which includes a plurality of individual frame elements having means for slidably connecting adjacent ends thereof with means for spreading the adjacent ends and for tilting said frame members, to displace the inner marginal edges of the frame members rearwardly into spaced relation to the overlying layer of canvas to prevent contact between the canvas and the underlying frame surface in response to brush pressure on the area of the canvas overlying the frame.

DETAILED DESCRIPTION OF THE FORMS OF THE INVENTION SHOWN IN THE DRAWINGS

Figure 1:
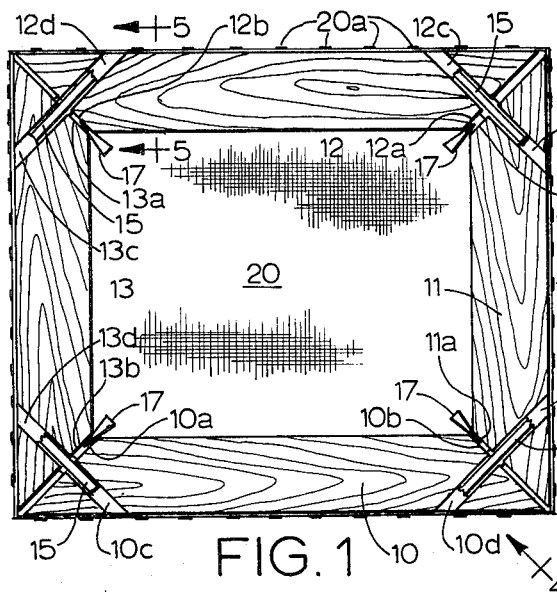
FIG. 1 is a rear elevational view of one form of my invention.
Figure 7:
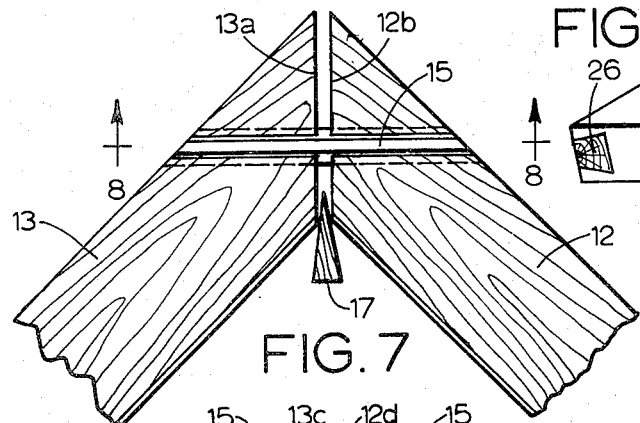
FIG. 7 is a frame corner shown in expanded position.

One form of the invention is illustrated in FIGS. 1, 3, 4, 7 and 8. In this form of the invention, a rectangular frame assembly is provided by four wooden frame members 10, 11, 12 and 13. The mating ends of these frame members are mitred as illustrated in FIGS. 1 and 7 with the mitred mating ends of each frame member being respectively identified by the reference characters 10a, 10b, 11a, 11b, 12a, 12b, 13a, and 13b.

Figure 5:
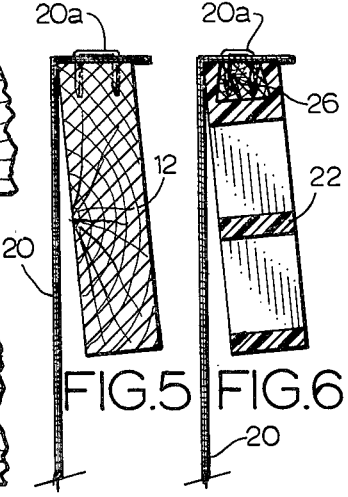
FIG. 5 is a sectional view taken substantially along the line 5—5 of FIG. 1.

A sliding guideway is cut across each of the mitred corners of the frame members and in the form shown, these guideways are dovetail grooves respectively identified by the reference characters 10c and 10d, 11c and 11d, 12c and 12d, and 13c and 13d. These dovetail grooves are sloped so that the inner ends of the grooves nearest the mating ends are deeper than the outer ends of the grooves. These grooves are generally normal to the center line plane of said mitred corners. Adjacent frame members are connected at the corners of the frame assembly by slidably inserting a dovetail connecting bridge member 15. This bridge member permits the corner joint to be expanded as by the insertion of a wedge element 17 while maintaining the right angle square corner relationship of the rectangular stretcher frame assembly. The inwardly sloping grooves 10c and d, 11c and d, 12c and d, and 13c and d cause the connected frame member to be tilted when the connecting bridge members 15 are driven into the aligned grooves. This tilting action displaces the inner edges of the frame elements 10 through 13 rearwardly away from the canvas 20 as shown in FIGS. 5 and 6.

Figure 3:
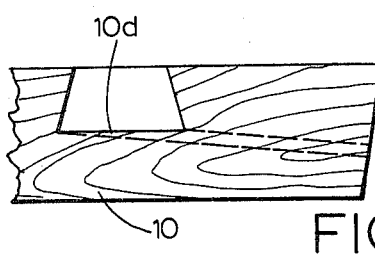
FIG. 3 is an elevational view of a typical corner without the connecting bridge inserted thereon.
Figure 4:
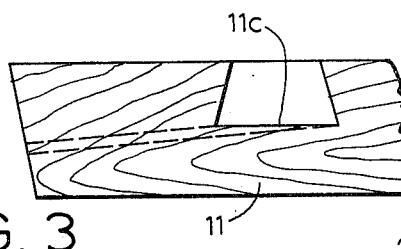
FIG. 4 is an elevational view as seen from the viewing line 4—4 of FIG. 1 with the connecting bridge in place and the frame in expanded, tilted position.
Figure 8:
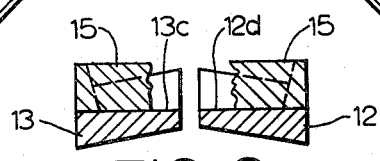
FIG. 8 is a sectional view taken substantially along the line 8—8 of FIG. 7.

The canvas 20 is stretched across the open area defined by the frame assembly and is secured to the outer edges of the frame members as by the staples 20a. The mitred ends of the frame elements 10 through 13 are beveled as best shown in FIGS. 3, 4, and 8 so that when the frame members are tilted by driving in the connecting bridge member 15, the surfaces of the mating ends will be substantially parallel to receive the wedge element 17 and provide a stable, frictional engagement thereof with said end surfaces.

Figure 2:
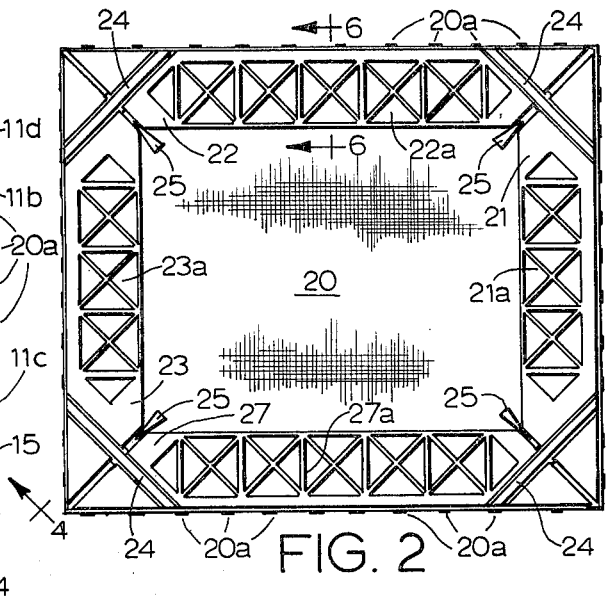
FIG. 2 is a rear view of a modified form of my invention.
Figure 6:
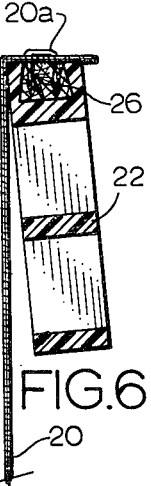
FIG. 6 is a sectional view taken substantially along the line 6—6 of FIG. 2.
Figure 9:
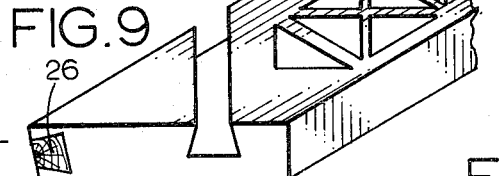
FIG. 9 is a perspective view showing one of the frame members of the form of the invention illustrated in FIG. 2.

FIGS. 2, 6, and 9 show an alternative form of the invention. In this form, the four frame members are designated 20, 21, 22 and 23. In this form of the invention, the frame members are made from a suitable plastic material. It is recognized that a number of plastic materials would operate satisfactorily; however, a thermo plastic material manufactured by General Electric Corporation and identified by its trandemark NORYL 731/SI, has been found to be excellent for this purpose. Each frame member has an open truss work respectively designated by the numerals 20a, 21a, 22a and 23a. The ends of the members 20 through 23 are mitred and beveled in a manner similar to that described in connection with the frame members 10 through 13 and keyway slots similar to the keyway slots 10c, 10d, 11c and 11d, 12c and 12d, and 13c and 13d, are formed across the end portions of the plastic members 20 through 23. These keyway slots are sloped in the same manner as the slots described in connection with the wooden frame members 10 through 13 so that the tilting of the frame members to displace the inner edges thereof rearwardly is accomplished by driving a dovetail bridge member 24 into the aligned slots. In the form shown, wedges 25 are provided for spreading the mitred ends as described in connection with the previous form of the invention, and these wedges are provided with serrated edges 25a. The wedges 25 are made from suitable plastic material which may be the same as identified above for the frame members. The dovetail bridge 24 is made from similar plastic material and is similar in configuration to the bridge elements 15, and is provided to connect the two adjacent mitred corners of the plastic frame members 20 through 23. FIGS. 6 and 9 show a wooden insert 26 mounted in the outer peripheral edges of each of the frame members 20 through 23 to receive and hold the canvas anchoring staples 20a.

Figure 10:
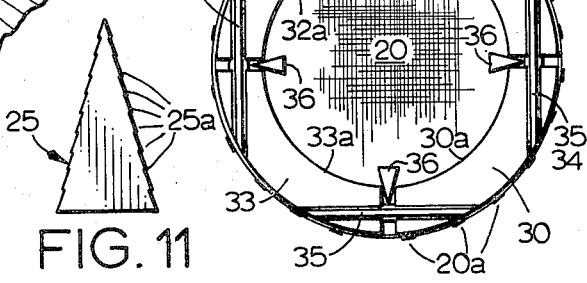
FIG. 10 is a rear plan view of another modification of the invention.
Figure 11:
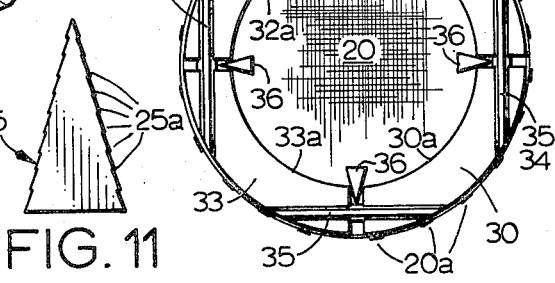
FIG. 11 is an elevational view of a wedge used in the form shown in FIGS. 2 and 9.

FIG. 10 shows a generally round frame unit made up of four wooden arcuate segments 30, 31, 32 and 33. Keyway slots 34 having a similar slope and configuration to slots 10c and d, 11c and d, 12c and d, and 13c and d, in the first form of the invention. These slots 34 extend across adjacent end portions of each of the frame segments 30 through 33 and a dovetail bridge member 35 is mounted in the slot portions 34 to bridge the joint between the adjacent ends of the segments 30 through 33. The segment ends are beveled similarly to the bevel of the frame members 10 through 13 and wedges 36 are driven into engagement with said beveled ends to expand the frame and stretch the canvas.

A 7° to 10° angle of tilt and bevel has been found to be the most satisfactory in order to produce the rearward displacement of the frame members so that the inner peripheral edges thereof will remain free from contact with the overlying canvas even during relatively heavy contact with the painter's brush. The outer edges of the various frame members are beveled so that they will be disposed substantially normal to the plane of the canvas 20.

It will be seen that I have provided a relatively simple, yet highly efficient means for spacing the inner edge portion of a stretcher frame for an artist's painting canvas, rearwardly of the canvas a sufficient distance to prevent contact between the canvas and the frame surface in response to brush strokes across the outer marginal portions of the canvas.

What is claimed is:

1. A stretcher frame for an artist's painting canvas, said frame comprising,
    a plurality of frame members adapted to receive a layer of canvas attached to the outer edges thereof across the front of the frame members,
    adjacent frame members having mating ends with the mating surfaces thereof beveled, said adjacent frame members having passages formed therein which are sloped forwardly toward the mating surfaces,
    a connecting bridge slidably mounted in each of said passages and extending across the mating ends from one frame member to another to slidably connect the same in a manner to produce a tilting of said frame members to displace the inner edges thereof rearwardly from the plane of the canvas attached to said frame,
    the bevel of the frame members being such that the mating surfaces of adjacent frame members are generally parallel one to the other with the bridges respectively mounted in said passages, and
    wedges driven between said parallel mating surfaces to expand the space between the mating ends and stretch the canvas attached to said frame members.

2. The structure set forth in claim 1 and said frame members being constructed of wood.

3. The structure set forth in claim 1 wherein the frame members and the wedges are made from molded plastic material with wooden stapling strips mounted in the outer edge portions thereof for attaching the canvas to the frame members.

4. The structure set forth in claim 1 wherein the frame members have dovetail grooves in the rear surfaces thereof, said grooves extending across the mating ends of the frame members and being deeper at the mating ends than at the outer ends, and
    said connecting bridge being cooperatively dovetail shaped to be slidably received in said grooves and bridge the mating ends of the frame members in a manner to produce a tilting of the frame members to displace the inner ends thereof rearwardly away from the plane of the canvas stretched thereon.

5. The structure set forth in claim 1 wherein the wedges have serrated edges for gripping the mating surfaces of the frame members.

6. The structure set forth in claim 1 wherein the frame members are in the form of acruate segments.

7. A stretcher frame for an artist's painting canvas, said frame comprising,
    a plurality of frame members adapted to receive a layer of canvas attached to the outer edges thereof across the front of the frame members, wherein the inner edges of said frame members lie generally in the same plane as said outer edges,
    adjacent frame members having mating ends with beveled mating surfaces, the portions of the frame members adjacent the mating ends having open-topped dovetail passages formed therein and extending at substantially right angles to the plane defined between the mating surfaces,
    a connecting bridge having a dovetail cross-sectional shape to be slidably received in the dovetail grooves of the frame members to permit the mating surfaces of the frame members to be separated to stretch the canvas attached to the frame members,
    means for forceably separating said mating surfaces to stretch said canvas,
    said frame members having the outer portions thereof raised above the inner marginal edge portions to provide substantial spacing between the layer of canvas stretched thereon and the inner portions of the assembled frame members withthe canvas applied thereto, said frame members being constructed and arranged with respect to the dovetail passages to provide raised outer portions when the respective connecting bridges are slidably received in the dovetail passages.

8. The structure set forth in claim 7 and said means for forceably separating said mating surfaces comprising,
    a plurality of wedges insertable between the respective beveled mating surfaces of the frame members.

* * * * *